Oct. 6, 1959  E. QUINN  2,907,424
CLUTCH CONTROL MECHANISMS
Original Filed Nov. 9, 1951  3 Sheets-Sheet 2
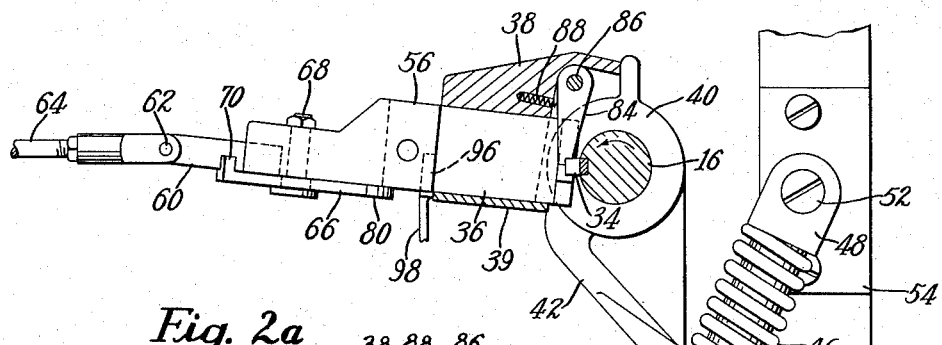
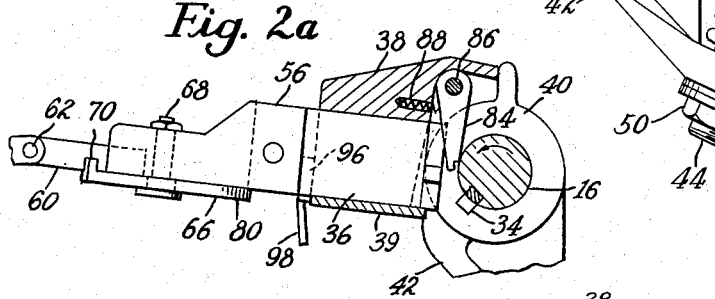
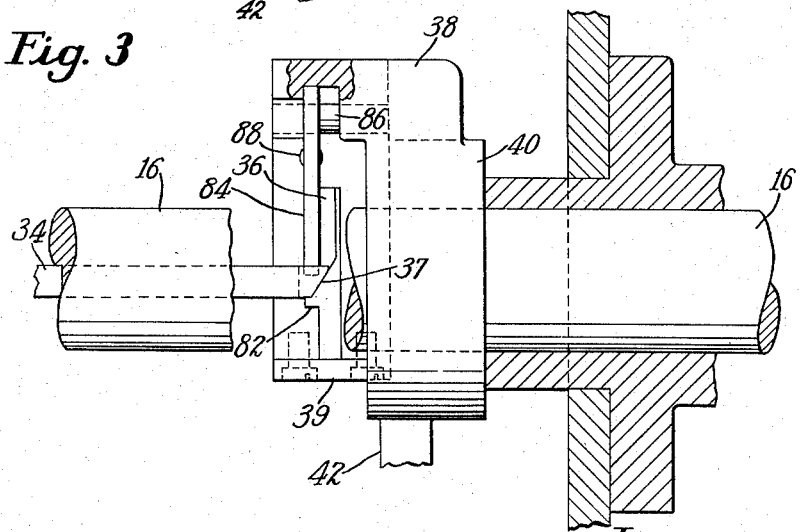
Inventor
Edward Quinn
By his Attorney
Thomas J. Ryan Oct. 6, 1959  E. QUINN  2,907,424
CLUTCH CONTROL MECHANISMS
Original Filed Nov. 9, 1951  3 Sheets-Sheet 3
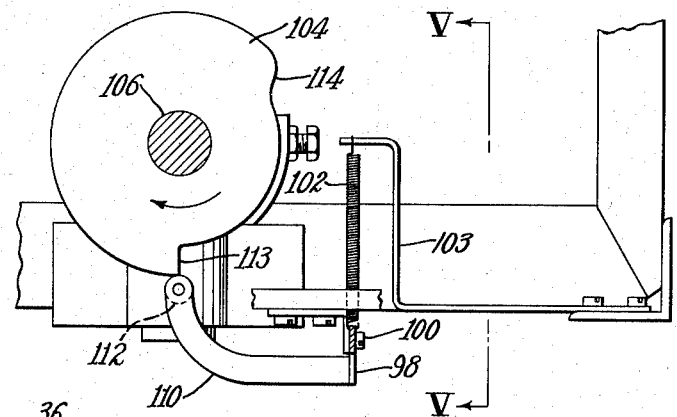
Fig. 4
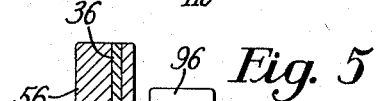
Fig. 5
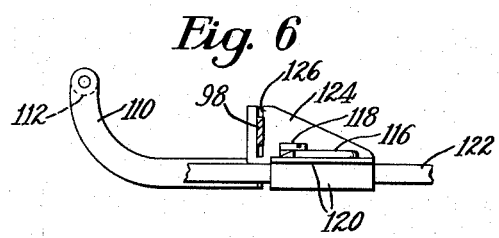
Fig. 6
Fig. 7
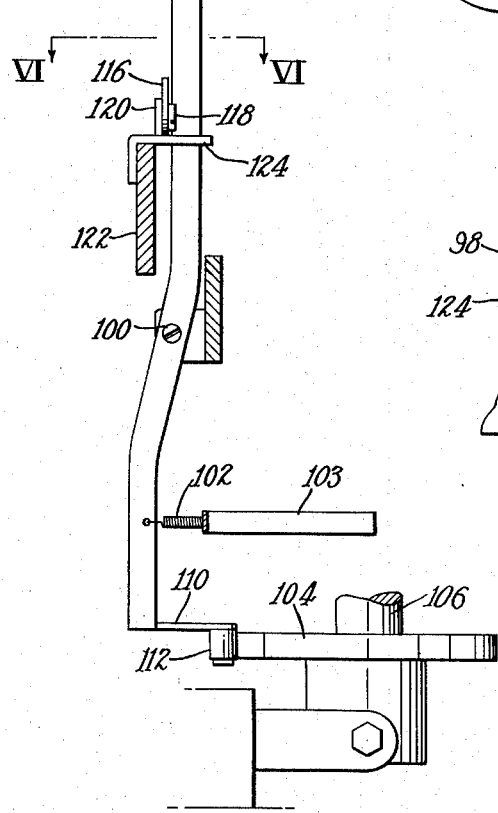
Inventor
Edward Quinn
By his Attorney
Thomas J. Ryan 2,907,424
Patented Oct. 6, 1959

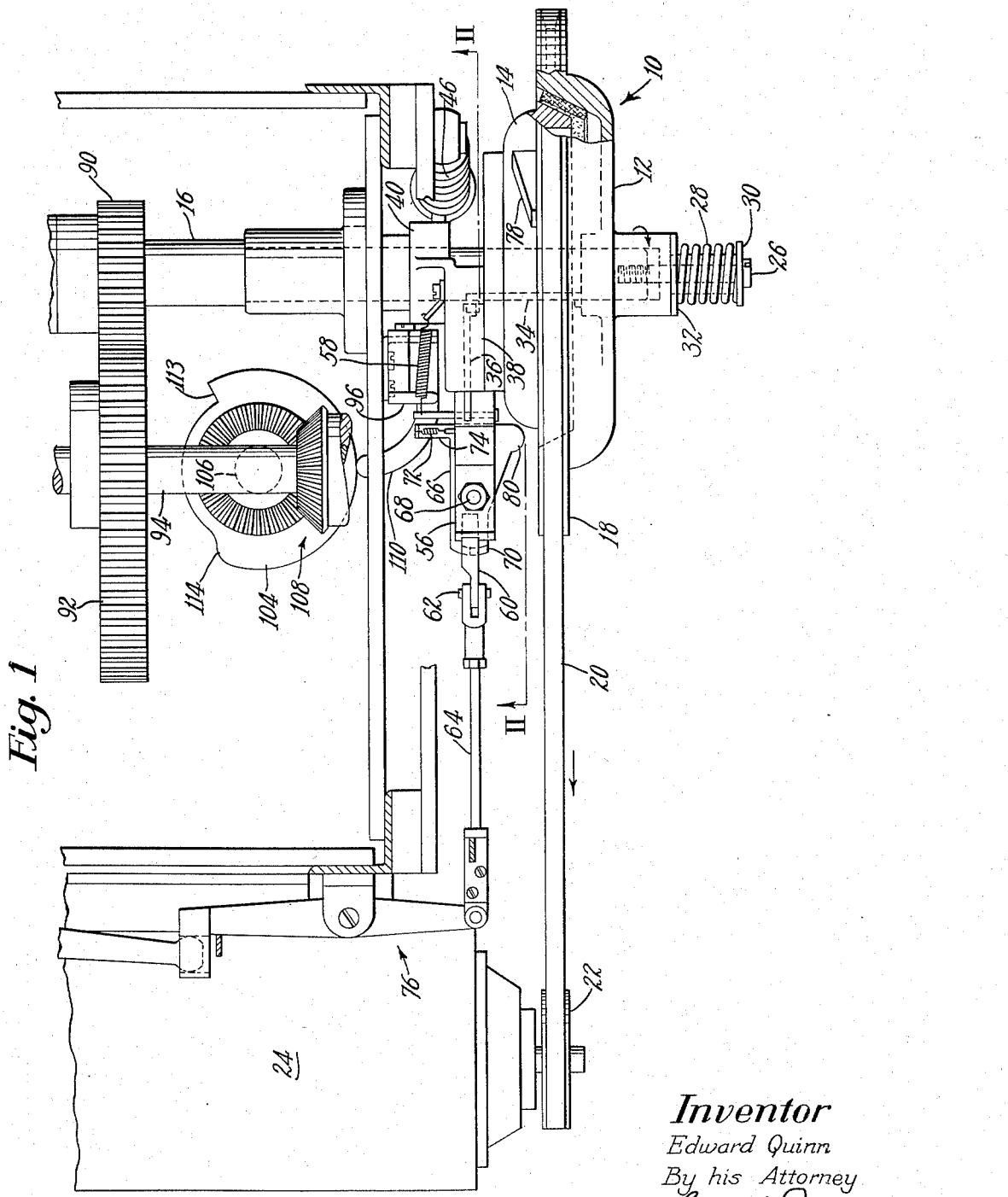

2,907,424

CLUTCH CONTROL MECHANISMS

Edward Quinn, Saugus, Mass., assignor to United Shoe Machinery Corporation, Flemington, N.J., a corporation of New Jersey Original application November 9, 1951, Serial No. 255,673, now Patent No. 2,740,138, dated April 3, 1956. Divided and this application November 10, 1954, Serial No. 468,074

3 Claims. (Cl. 192—24)

This invention relates to clutch control mechanisms and it is herein disclosed as embodied in the machine illustrated and described in United States Letters Patent No. 2,740,138, issued in my name April 3, 1956, the present application being a division thereof. This control mechanism is arranged to cause the machine to operate in a cycle initiated manually and terminated automatically and, during the cycle, to stop automatically one or more times to enable the operator to manipulate the work. One of the intermediate stops or dwells of the machine can be omitted at the will of the operator. After each intermediate stop the machine can be started again manually.

It is an object of the present invention to provide a clutch control mechanism having the characteristics above outlined.

The present invention consists in the novel features hereinafter described, reference being had to the accompanying drawings which illustrate one embodiment of the same, selected for purposes of illustration, and the said invention is fully disclosed in the following description and claims.

In the accompanying drawings;

Fig. 1 is a plan view of an illustrative clutch control mechanism embodying the invention;

Fig. 2 is a section taken on the line II—II of Fig. 1;

Fig. 2a is a view similar to Fig. 2 showing some parts in different position;

Fig. 3 is an enlarged detail view in elevation illustrating certain features shown in Fig. 2;

Fig. 4 is a plan view illustrating details of a cam and its follower;

Fig. 5 is a side elevation partly in section on the line V—V of Fig. 4;

Fig. 6 is a section taken on the line VI—VI of Fig. 5; and

Fig. 7 is a rear elevation illustrating a part of the mechanism shown in Fig. 5.

The power driven machine of which the present clutch control mechanism is a part is driven through a clutch 10 (Fig. 1) having a driving element 12 and a driven element 14. As shown herein the clutch 10 may be a cone friction clutch and the driving element 12 may be freely rotatable and also slidable axially upon a shaft 16, the driven element 14 being fixed upon that same shaft. The driving element 12 has fixed upon it a pulley 18 driven by a belt 20 from a pulley 22 on the shaft of a motor 24. The direction of rotation of the shaft 16 is counterclockwise as indicated by the arrow on Fig. 2.

Extending coaxially from an end of the shaft 16 is a screw 26 which is surrounded by a compression spring 28 bearing at one end against a washer 30 backed by the head of the screw and bearing at its other end against a washer 32 backed by an end face of the hub of the driving element 12 of the clutch, the function of the spring being to urge the driving element of the clutch into engagement with the driven element 14 of the clutch. The driving element 12 of the clutch is normally held out of such engagement by a slide 34 guided for axial movement in a longitudinal groove in the shaft 16. One end of the slide 34 has an outwardly extending foot which bears against an end face of the hub of the driving element 12 of the clutch and the other end bears against a slide 36, hereinafter termed a cam slide because the engaging surfaces of the slides 34 and 36 are complementally inclined, as indicated by the numeral 37 on Fig. 3, to enable the cam slide 36 to exert a camming thrust endwise upon the slide 34. The cam slide 36 is slidable in a guideway formed in an irregularly shaped bracket 38 having a bottom plate 39 rigidly secured to it and having also a hub 40 in which the shaft 16 rotates freely, the bracket having furthermore an extension 42 through a suitable opening of which passes a pin 44 (Fig. 2). A coil compression spring 46 surrounding the pin 44 has one end bearing against a head 48 on the pin and its other end bearing against the extension 42 to urge the bracket 38 clockwise (as seen in Fig. 2) as far as permitted by a nut 50 threaded on the pin. The head 48 pivotally mounted by a pin 52 upon a portion 54 of the machine frame. The spring 46 yieldingly holds the bracket 38 against counterclockwise movement about the shaft 16.

To enable the spring 28 to effect engagement, i.e. coupling, of the clutch 10, the cam slide 36 is moved to the left from the position shown in Fig. 2 to the position in Fig. 2a to withdraw it from engagement with the inclined end surface 37 of the slide 34. The cam slide 36 (Fig. 2) extends to the left beyond the end face of the bracket 38 and has secured to it a head 56 which is normally held in abutting engagement with said end face by a tension spring 58. Formed in the left-hand end portion of the head 56 is a guideway for a slide 60 which, at its left-hand end portion, is pivotally connected by a pin 62 to a rod 64. The cam slide 36 is normally latched to the slide 60 by means of a latch 66 pivotally mounted by a pin 68 to the bottom face of the head 56, the latch 66 having an arcuate flange 70 engaging an arcuate groove in the slide 60 and being normally held in such engagement by a tension spring 72 having one end anchored to the head and its other end anchored to a bracket 74 mounted on the latch. The operator, merely by pulling the rod 64 to the left, can withdraw the cam slide 36 from engagement with the slide 34 and thus start the machine running. If desired, a simple treadle arrangement for doing this can be provided in place of the more complicated treadle operated mechanism including a linkage like that indicated in part on the accompanying drawings by the reference numeral 76 and fully disclosed in my patent No. 2,740,138, above mentioned.

Soon after the driven element 14 of the clutch begins turning, a cam 78 on the driven element engages a rounded edge portion 80 of the latch 66 and turns the latch far enough counterclockwise to disengage the arcuate flange 70 from the slide 60, thereby setting the cam slide 36 free of the operator controlled rod 64 and enabling the spring 58 to move the cam slide into normal position wherein the inclined surfaces 37 will cam the slide 34 into position to uncouple the clutch 10. As soon as the clutch has thus been uncoupled, the under surface of the descending slide 34 adjacent to its end will strike a shoulder 82 (Fig. 3) on the cam slide 36, bringing the shaft 16 to rest, and the shock of sudden stoppage will be taken up by the spring 46. Rebound of the shaft 16 is prevented by a pawl 84 pivotally mounted in the bracket 38 by a pivot pin 86 and having a notch in its free end. As the shaft 16 completes its revolution the slide 34 in descending will push the pawl 84 out of its way against the opposition of a compression spring 88 until this spring causes the above-mentioned notch to engage the slide 34 and hold its against rebound. Before the clutch members can be re-engaged for another cycle of the shaft 16, the rod 64 must first be returned to its initial position as illustrated in Figs. 1 and 2 together with the slide 60 where the cam slide 36 and the slide 60 are again latched together by the latch 66. In this manner the rod 64 again becomes effective to cause engagement of the clutch members by withdrawing the cam slide 36 from engagement with the slide 34.

As so far described, the illustrated clutch control mechanism is similar in principle to that disclosed in United States Letters Patent No. 1,026,067, granted May 14, 1912, on an application filed in the name of Orrell Ashton.

The shaft 16 does not drive the machine directly; it has fixed on it a gear 90 (Fig. 1) which drives a gear 92 fixed on a shaft 94 which drives the machine through a complete cycle for each revolution. The ratio of the gears 90 and 92 is such as to require three revolutions of the shaft 16 for one revolution of the shaft 94 or one complete cycle of the machine. The subject control mechanism, therefore, in the absence of further provision, will stop the machine three times for each cycle, that is, twice during the cycle and once at the end of the cycle. Although the first stop during the cycle may be desirable to enable the operator to manipulate the work or make certain adjustments, if often happens that the second stop can be omitted. To this end there is provide a member 96 (Figs. 2 and 2a), hereinafter termed an interponent, which is interposed between the cam slide head 56 and the bracket 38 before the shaft 16 completes its second revolution, thereby preventing the cam slide 36 from moving into position to uncouple the clutch 10. The interponent 96, as shown in Fig. 5, is fixed upon the upper end of a lever 98 fulcrumed upon a pivot pin 100 secured to the frame of the machine. A spring 102 anchored to a bracket 103 on the machine frame urges the lever 98 counterclockwise to bring the interponent 96 into operative position, and is prevented at the end of the first revolution of the shaft 16 from so doing by a cam 104 fixed on a shaft 106 driven through bevel gearing 108 (Fig. 1) from the shaft 94. Fixed upon the lower end of the lever 98 is an arm 110 which carries a cam roll 112 urged toward the periphery of the cam 104 by the spring 102. During the first third of the main cycle of the machine the cam 104 holds the lever 98 in the position shown in Fig. 5 with the interponent 96 in inoperative position, and at the end of the first third of said cycle the cam comes to rest in the position shown in Fig. 4 with the interponent 96 still in inoperative position. At the beginning of the second third of the cycle the cam roll 112 passes over a drop 113 and enters a recess or low sector in the periphery of the cam 104, permitting the spring 102 to swing the lever 98 counterclockwise and move the interponent 96 in a position wherein it is operative to prevent the uncoupling of the clutch 10. At the beginning of the last third of the cycle the lever 98 is returned to its inoperative position, shown in Fig. 5, by a rise 114 on the cam 104 and the lever remains in this position until the beginning of the second third of the next succeeding cycle of the machine.

In some circumstances it is desirable to have the machine come to rest at the end of the second third of the main cycle to permit inspection of the work. To this end means are provided for holding the interponent 96 inoperative. Referring to Figs. 6 and 7, an arrester 116, herein illustrated as a flat angle plate having a pair of arms in the form of an acute angled bell crank, is pivotally mounted at its elbow on a stud 118 fixed in a bracket 120 secured to a cross bar 122 of the machine frame. The bracket 120 has an extension in the form of a shelf 124 which supports the arrester 116 in both the operative and inoperative positions of the arrester. Formed in the shelf 124 is an open ended slot 126 up through which the lever 98 extends. When it is desired to prevent the operation of the interponent 96, the arrester 116 is swung into operative position, as shown in Fig. 7, in which position the short arm of the arrester extends across the path of movement of the lever 98 and prevents movement of the lever into operative position under the influence of the spring 102. The interponent 96, thus held out of its operative position, is powerless to prevent the cam slide 36 from disengaging the clutch 10 at the completion of the revolution of the shaft 16.

Having thus described my invention, what I claim as new and desire to secure by Letters Patent of the United States is:

1. In a power driven machine having a clutch comprising a driving element and a driven element, a control mechanism comprising a cam slide movable to and from an operative position in which it is operable to cause the clutch elements to be uncoupled, an interponent, a spring for advancing said interponent into position to hold the cam slide against movement into its operative position, and an arrester movable into and out of position to arrest the advancement of the interponent.

2. In a power driven machine having a clutch comprising a driving element and a driven element, a control mechanism comprising a cam slide movable to and from an operative position wherein it is operable to cause the clutch elements to be uncoupled, an interponent, a spring for advancing the interponent into position to hold the cam slide against movement into its operative position, a cam for retracting said interponent to enable the cam slide to advance into its operative position, and an arrester movable into and out of position to arrest the advancement of the interponent.

3. In a power driven machine, a clutch comprising a driving member and a driven member, manually actuated means for effecting a coupling of said members to initiate a cycle of operation of the machine, automatic means for uncoupling said members at the end of a complete machine cycle, said automatic means being operable also to effect at least one other uncoupling of said members for causing at least one intermediate stopping of the machine prior to completion of said cycle, a second automatic means normally operable to prevent the first said automatic means from effecting said one other uncoupling, and operator controlled means for rendering the second-mentioned automatic means inoperable at will.

References Cited in the file of this patent

UNITED STATES PATENTS

| 1,851,171 | Goellner | Mar. 29, 1932 |
| 2,626,030 | Goldberg | Jan. 20, 1953 |

FOREIGN PATENTS

| 695,949 | Germany | Sept. 6, 1940 |
| 501,351 | Belgium | Mar. 15, 1951 |